F. P. BURR.
ICE CREAM FREEZER.
APPLICATION FILED AUG. 1, 1908.

926,639.

Patented June 29, 1909.
2 SHEETS—SHEET 1.

Witnesses
C. J. Reed
C. L. Weed

Frederick P. Burr
Inventor
by Seymour & Earle
Attys

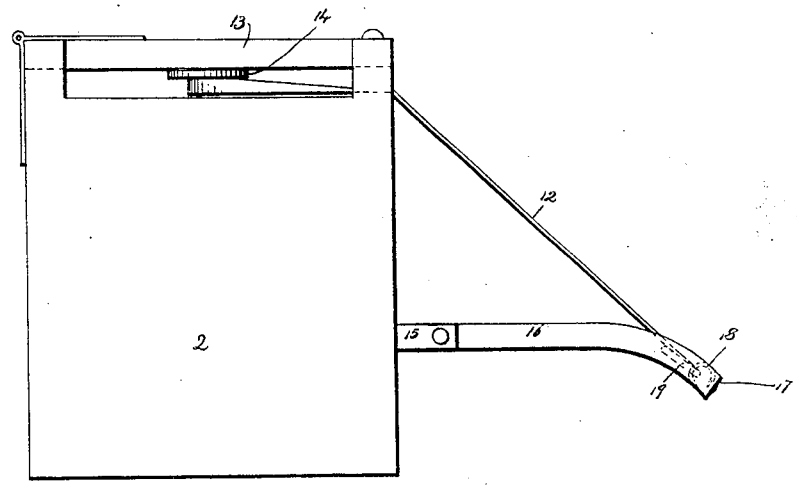

UNITED STATES PATENT OFFICE.

FREDERICK P. BURR, OF MIDDLETOWN, CONNECTICUT, ASSIGNOR TO THE AUTOSPIN COMPANY, INC., OF MIDDLETOWN, CONNECTICUT, A CORPORATION.

ICE-CREAM FREEZER.

No. 926,639.　　　　Specification of Letters Patent.　　　　Patented June 29, 1909.

Application filed August 1, 1908. Serial No. 446,459.

*To all whom it may concern:*

Be it known that I, FREDERICK P. BURR, a citizen of the United States, residing at Middletown, in the county of Middlesex and State of Connecticut, have invented a new and useful Improvement in Ice-Cream Freezers; and I do hereby declare the following, when taken in connection with the accompanying drawings, and the numerals of reference marked thereon, to be a full, clear, and exact description of the same, and which said drawings constitute part of this specification, and represent, in—

Figure 1:
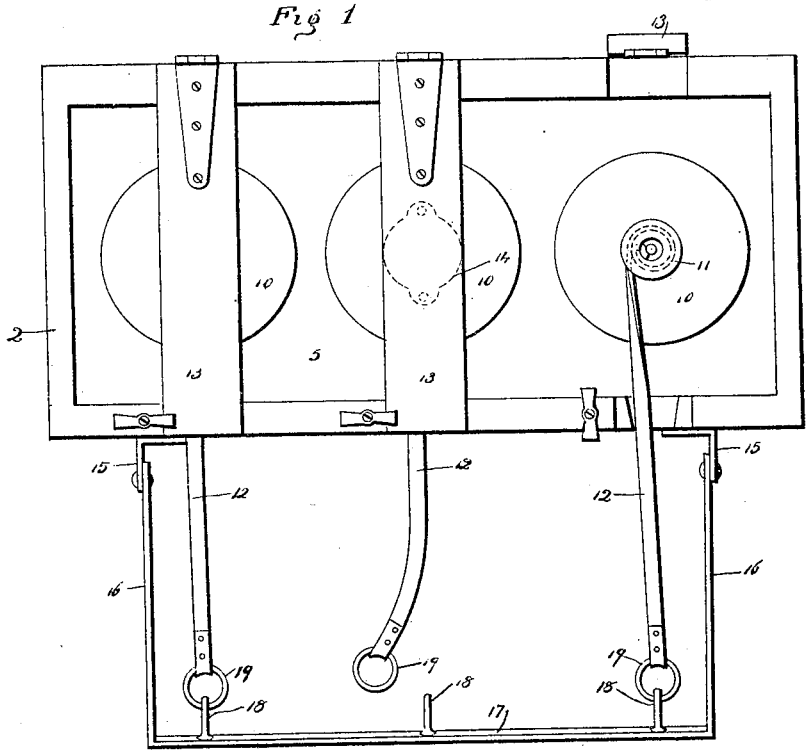
Figure 2:
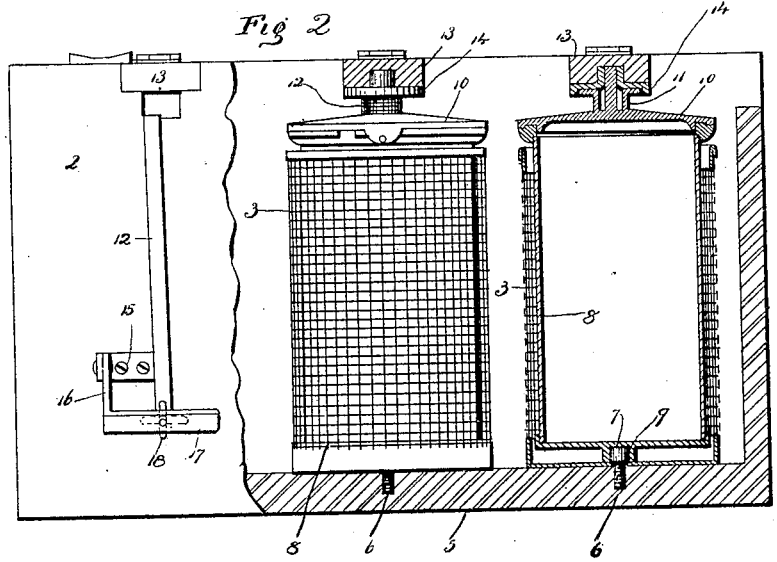

Figure 1 a top or plan view of an ice cream freezer having three containers, the support for one of the containers being turned back. Fig. 2 a broken front view showing a side view of one of the containers and a sectional view of another container. Fig. 3 an end view of the freezer with the operating bar in its lowest position.

This invention relates to an improvement in ice cream freezers and is an improvement on the freezer shown and described in U. S. Patent No. 637,078 granted to me November 14, 1899. In my previous patent the can was supported in a tub or pail and adapted to be rotated by having a cord attached to the neck on the top of the can around which neck the cord might be wound and so that by drawing the cord outward the can would be rotated and given sufficient rotary force to wind the cord in the opposite direction and so that by repeatedly drawing the cord outward and allowing it to be wound upon the central bearing the can or container would be constantly rotated first in one direction and then in the other.

The object of the present invention is to provide simple means for operating the cord and to provide for a series or battery of cans or receptacles within the same tub, and so that different kinds or flavors of cream or ices can be frozen at the same time; and the invention consists in certain details of construction and arrangement of parts as will be hereinafter described and particularly recited in the claim.

In carrying out my invention I provide a tub 2 of suitable size and shape to hold the desired number of cans. For convenience of illustration I have shown a tub with three cans or containers. Mounted in the bottom of the tub are three guards 3 of perforated metal or wire netting. These guards are secured to the bottom 5 of a tub by screws 6 which have large heads 7. These guards are larger in diameter than the cans or containers 8 which set into them, and the cans are formed at their lower ends with sockets 9 to set over the screw heads 7 whereby the cans or containers are centered. These cans have tight locking covers 10 formed with necks 11 to which operating straps 12 are secured and around which the straps may be wound in the same manner as in my previous patent. The tops of the cans are supported in any desired way; as herein shown by transverse locking strips 13 which are hinged to one side of the tub and interlocked with the opposite side and formed with sockets 14 to engage with the necks 11 whereby the cans are supported in a vertical position, but free for rotation.

Hinged to brackets 15 secured to the front of the tub are arms 16 supporting a bar 17 having hooks 18 with which rings 19 secured to the ends of the straps 12 may engage and so that all the cans or containers in the tub may be rotated at the same time. By moving the bar away from the tub the straps 12 are drawn outward, thus turning the cans in one direction and with such force that by the continued rotation the straps will be wound in the opposite direction, it being understood that the bar 17 will be raised or allowed to be lifted by the strap when the rewinding takes place and when rewound another outward movement of the bar 17 will rotate the containers in the opposite direction.

If for any reason it is desired to examine the contents of one can the strap of that can may be disengaged from the operating bar and that can opened without disturbing the movement of the other cans.

It will thus be seen that one or more of the cans may be operated without interfering with the other cans, so that cream may be frozen in one or more cans while the remaining cans are at rest.

It will be understood that the tub around the guards will be packed with ice and salt in the usual manner of freezing cream. The guards keeping the ice away from the cans, allows the saline solution to come in contact with the cans, and consequently the contents will be frozen more rapidly than if the ice were in contact with the cans and the ice does not interfere with the rotation of the cans.

I claim:—

An ice cream freezer comprising a tub, a plurality of containers mounted in said tub and capable of rotation therein, a strap connected with each container, a bar hinged to said tub, and means for detachably connecting said straps with said bar, substantially as described.

In testimony whereof, I have signed this specification in the presence of two subscribing witnesses.

FREDERICK P. BURR.

Witnesses:
SAMUEL STEARNS,
ELMER G. DERBY.